(12) United States Patent
Kolar (10) Patent No.: US 12,285,975 B2
(45) Date of Patent: Apr. 29, 2025

(54) ACTUATING MECHANISM FOR A CASTER

(71) Applicant: Linet Spol. S R.O, Slany (CZ)

(72) Inventor: Vladimir Kolar, Slany (CZ)

(73) Assignee: Linet Spol. S R.O, Slany (CZ)

( * ) Notice: Subject to any disclaimer, the term of this patent is extended or adjusted under 35 U.S.C. 154(b) by 20 days.

(21) Appl. No.: 18/246,847

(22) PCT Filed: Sep. 20, 2021

(86) PCT No.: PCT/CZ2021/000046
§ 371 (c)(1),
(2) Date: Mar. 27, 2023

(87) PCT Pub. No.: WO2022/068978
PCT Pub. Date: Apr. 7, 2022

(65) Prior Publication Data
US 2023/0373244 A1    Nov. 23, 2023

(30) Foreign Application Priority Data

Sep. 30, 2020    (CZ) .............................. CZ2020-539

(51) Int. Cl.
*B60B 33/00* (2006.01)
*B60B 33/02* (2006.01)
*B60B 33/06* (2006.01)

(52) U.S. Cl.
CPC ........ *B60B 33/063* (2013.01); *B60B 33/0021* (2013.01); *B60B 33/0039* (2013.01);
(Continued)

(58) Field of Classification Search
CPC ............ B60B 33/0028; B60B 33/0055; B60B 33/0094; B60B 33/0039; B60B 33/0049;
(Continued)

(56) References Cited

U.S. PATENT DOCUMENTS 5,774,936 A * 7/1998 Vetter ................... B60B 33/021
16/35 R
7,406,745 B1 * 8/2008 Chou .................... B60B 33/026
16/35 R (Continued)

FOREIGN PATENT DOCUMENTS

CN    206544435 U  * 10/2017
DE    102007039208 A1 *  5/2008   ........... A61G 7/0528

(Continued)

OTHER PUBLICATIONS

European Patent Office, International Search Report, mailed Feb. 14, 2022, in International Patent Application No. PCT/CZ2021/000046, filed Sep. 30, 2021.

(Continued)

*Primary Examiner* — Chuck Y Mah
(74) *Attorney, Agent, or Firm* — Thedford I. Hitaffer; Hitaffer & Hitaffer, PLLC (57) ABSTRACT

An actuating mechanism for a caster that brakes and positions the caster by means of a cam mechanism that enables braking of the caster using minimum forces developed on the brake lever or brake rod. The mechanism helps to handle casters of patient support apparatuses in hospital and nursery facilities easily, using minimum force developed by caregivers or by an electronic caster brake systems if used for braking of casters of patient support apparatuses, as well. The mechanism may produce an outstanding decrease of noise level of castors on patient support apparatuses.

12 Claims, 7 Drawing Sheets

(52) U.S. Cl.
CPC ...... *B60B 33/0049* (2013.01); *B60B 33/0057* (2013.01); *B60B 33/0068* (2013.01); *B60B 33/0086* (2013.01); *B60B 33/021* (2013.01); *B60B 33/025* (2013.01)

(58) Field of Classification Search
CPC ............ B60B 33/0057; B60B 33/0068; B60B 33/0081; B60B 33/0084; B60B 33/0092; B60B 33/025; B60B 33/021; B60B 33/023; B60B 33/0042; B60B 33/0073; B60B 33/0078; B60B 33/0086; B60B 37/10; B60B 2200/222; B60B 2200/24; B60B 2200/242; B60B 2900/531; A61G 7/0528; F16D 49/00; F16D 65/42; F16D 2121/14; F16D 2125/32

See application file for complete search history.

(56) References Cited

U.S. PATENT DOCUMENTS

| | | | |
|---|---|---|---|
| 7,506,404 B2 | 3/2009 | Block et al. | |
| 8,789,662 B2 | 7/2014 | Childs et al. | |
| 8,850,657 B1* | 10/2014 | Yang | B60B 33/0092 16/35 R |
| 9,139,043 B1* | 9/2015 | Fan | B60B 33/0047 |
| 10,486,466 B1* | 11/2019 | Yang | B60B 33/0068 |
| 2019/0358998 A1* | 11/2019 | Patmore | F16D 49/00 |
| 2021/0061003 A1* | 3/2021 | Molozis | B60B 33/021 |

FOREIGN PATENT DOCUMENTS

| | | |
|---|---|---|
| DE | 102016113069 A1 | 1/2018 |
| EP | 2639079 A1 | 9/2013 |
| GB | 2179848 A | 3/1987 |
| JP | 2019521036 A * | 7/2019 |

OTHER PUBLICATIONS

European Patent Office, Written Opinion, mailed Feb. 14, 2022, in International Patent Application No. PCT/CZ2021/000046, filed Sep. 30, 2021.

* cited by examiner

ACTUATING MECHANISM FOR A CASTER

CROSS-REFERENCE TO RELATED APPLICATIONS

This application, filed under 35 USC 371, is a United States National Stage Application of International Application No. PCT/CZ2021/000046, filed Sep. 20, 2021, which claims priority to CZ Application No. PV2020-539, filed on Sep. 30, 2020, the disclosures of which are incorporated herein by reference in their entirety.

TECHNICAL FIELD

A technical solution describes an actuating mechanism for a caster which brakes and positions the caster by means of a cam mechanism which enables braking of the caster using minimum forces developed on the brake lever or brake rod. The presented technical solution helps to handle casters of patient support apparatuses in hospital and nursery facilities easily, using minimum force developed by caregivers or by an electronic caster brake systems if used for braking of casters of patient support apparatuses, as well. Another positive aspect of this presented technical solution is an outstanding decrease of noise level of castors on patient support apparatuses.

PRIOR ART

The technical solution described in this document focuses on actuating and control of casters used with beds, particularly patient support apparatuses in hospitals, health care and nursing care facilities or settings. The aforesaid beds have four and more casters or guiding wheels fixed to the basic frame, being able to rotate around horizontal and vertical axis to move the bed from one place to another, and are equipped with a brake to fix the casters in desired position and move the bed in desired direction.

Patient support apparatuses known from the prior art have, in principle, four standard casters. These casters may be equipped with an individual system for locking (blocking) of rotation of the caster, which is located inside the caster, or are controlled locally at each individual caster, or have centralized systems for locking all casters at once. Disadvantage of the above stated systems for locking and/or rotating is that these systems develop too big or too small locking and/or braking forces actuating the casters, which causes harm to casters or insufficient locking and/or braking of caster. These types of casters all rotate facing in direction of travel and/or rotate around vertical axis and/or rotate horizontally around fixing axis.

The aforesaid prior art is disclosed in the U.S. Pat. No. 8,789,662B2. In this technical solution all casters are braked, and in case of neutral mode and brake release, all casters rotate around vertical axis, which means that all casters may turn to different sides. However, except turning left and right, each patient support apparatus needs to be also directed facing direction of travel, which is provided in this case by big double wheels that may be actuated by a motor, as well. Disadvantage of this technical solution is thus need of another pair of casters to direct the patient support apparatus to desired direction of travel. It is financially demanding, in addition necessary additional wheels with actuating system to handle and brake the patient support apparatus increase the weight of the patient support apparatus. The patient support apparatus is thus heavy, more expensive and more complex for production.

Prior art also discloses beds or wheeled equipment such as trolleys, prams, chairs, stretchers and similar which have combined casters with only horizontal rotation and casters with horizontal and also vertical rotation. Should a patient support apparatus be equipped with casters which all can rotate horizontally and vertically, a problem occurs how to properly direct such patient support apparatus into the desired travel direction. Such patient support apparatuses need to have then at least one of the casters as a directional caster, which enables only horizontal rotation in the direction of travel by using independent locking mechanism located on this caster. The locking mechanism locks (or blocks) such caster to rotate around vertical axis of the caster. The locking mechanism may be in a form of an independent lever or a control member fixed to the caster to lock the direction of travel. Such locking mechanism thus complicates structure of the caster, in addition, it is necessary to have a lever or a control member at disposal all the time to lock the direction of travel on the caster directly. Optionally, such lever or a control member for locking the direction of travel may be integrated in the caster itself, which is complex and financially demanding. Mostly such integrated lever or control member use to be smaller than the brake lever and a caregiver therefore needs to bend down to the caster and manually set the lever, which is not user friendly. Sometimes a caregiver needs to exert bigger force to push the lever, sometimes it is difficult to do it even by a foot.

Another disadvantage of such caster type is that the caster has only a simple cam which actuates (controls) only one pin or lever controlling the caster brake system, and to set direction of travel the caster needs to be equipped with an independent locking system described above. These systems of inner arrangement of braking and directional mechanisms of casters are quite sizable, need to be actuated by two types of forces, which brings a danger of improper usage of such forces and worse handling and higher fault rate. In addition, such double structure of braking and directional mechanisms does not fit the standard size of a pin for fixing the caster which results in increasing of lowest safe height of the patient support apparatus above the ground by several other centimetres that may consequently increase a risk of fall of a patient.

The risk of fall of a patient from the patient support apparatus of any type is a serious problem that must be addressed. Falls in hospital facilities and particularly nursery facilities and settings represent the most risky unpredictable events, cause complications with respect to treatment and prolong painful health condition of a patient and following prolonged period of treatment. Due to these reasons falls are highly undesirable.

To avoid undesired falls from patient support apparatuses with higher lower position of the frame due to large casters it is advisable to use patient support apparatuses with lowered safe position due to smaller height of used casters. The height of a caster can be essentially decreased when using a caster with a band brake which is disclosed in the international patent application PCT/CZ2021/000017 filed by the same applicant which is thereby included herein in its entirety.

In principle, casters used with patient support apparatuses in health and nursery facilities and settings should satisfy necessary requirements for handling with the patient support apparatus as following: a caster should travel independently. i.e. the caster can rotate free around vertical and horizontal axis; a caster needs to have a brake, i.e. a mechanism which locks the caster to rotate around horizontal axis. As casters can rotate also around vertical axis it is therefore necessary so that such caster had a mechanism for locking of direction, i.e. mechanism locking rotation around vertical axis and directing the caster into the direction of travel.

Another method of locking casters is so called TOTAL LOCK, when the caster is locked for rotation around vertical axis as well as horizontal axis.

All standard positions of a caster are actuated by a central caster control system pedal (or lever). The central caster control system pedal, or individual pedal on an individual caster, actuates positions of caster such as "RIDE (or TRAVEL)", "BRAKED", and "LOCKED". The position "RIDE" means that all casters are centrally actuated or each individual caster is set in position of ride (travel). The position "BRAKED" means that majority or all casters are set into position of TOTAL LOCK by means of the central caster control system pedal. The position "LOCKED" means that one or two casters are set by the central caster control system or an individual pedal into the position of locking of direction and other casters are in position of ride.

All the above stated positions are currently solved in the way that the inner structure of a caster comprises one cam with three positions. This solution is disclosed by U.S. Pat. No. 7,506,404B2 by company TENTE GmbH. However, such casters with inner actuating system have several insufficiencies. One cam inside the caster is difficult to be optimized with respect to its function, i.e. different way of using. Braking of caster is done by friction, release of brake is done when cam force pushes braking block into the band and due to spring force the caster is released. To lock rotation around vertical axis lifting members are used, but very often teeth of one locking disc hit the other disc due to which the mechanism is damaged after some time. When using one cam it is technically not possible to design the shape of the cam so that the central caster control system pedal or the caster pedal are in the defined positions "RIDE", "BRAKED" and "LOCKED". At standard mechanism the pedal is always in a position when on-state function of central caster control system is not obvious. Another disadvantage of this type of caster is that due to developing heavy force on mechanism the casters need to be designed and made from rigid metal materials which causes casters to be very noisy.

In case of casters used with patient support apparatuses in health and nursery facilities and settings it is important for caregivers to have central actuation (control) of casters, not the individual actuating pedals (or levers) located at the individual casters. Therefore very often there is used a system of e.g. three casters having three positions (total lock, ride forward, ride backward) and one caster having three positions such as total lock, ride and locking of direction. Prior art discloses also different arrangements of casters in which type of one cam in the pin is changed and other mechanism remains the same.

SUMMARY OF THE INVENTION

The above mentioned substantial insufficiencies of the existing known technical solutions for actuating casters are solved by presented technical solution for actuating mechanism for a caster comprising braking mechanism and directional mechanism to lock the caster in direction of travel and to lock rotation of the caster around vertical axis, wherein both these mechanisms are part of a standard pin for fixing the caster. This system simplifies caster structure and decreases total height of the caster by which also the lowest possible safe height of the patient support apparatus is decreased. The presented solution enables usage of braking mechanism and directional mechanism with exerting minimum force to actuate the caster. Due to using minimum forces for actuating, noise level of casters is decreased, too, as the individual components and members can be made from plastic materials.

The presented technical solution also removes insufficiencies relating to position of the actuating pedal of the caster or central caster pedal on the chassis of the patient support apparatuses. The presented solution optimizes position of the actuating pedal so that it is fully obvious in which position such pedal is, i.e. either in position "RIDE", "BRAKED" or "LOCKED".

The presented technical solution discloses a patient support apparatus comprising a patient surface deck, an upper frame, a lifting mechanism, a bottom frame, number of casters fixed to the bottom frame by a pin, and an actuating pedal fixed to the pin of a caster. The actuating pedal actuates positions of the caster, such as braking position, neutral mode and directional ride position. Each caster comprises a cam mechanism with number of switch mechanisms for actuating and changing the individual positions of the caster.

The above mentioned substantial insufficiencies of the existing known standard braking and directional mechanisms are solved by presented actuating mechanism for a caster disclosed herein. The caster is primarily used with patient support apparatuses in health and nursery facilities and settings. Optionally, such caster can be used with any type of furniture that needs to be moved from point A to B. The presented actuating mechanism for a caster actuates several positions of the caster and can be used also with casters comprising band brake, as disclosed in the international patent application PCT/CZ2021/000017 filed by the same applicant which is thereby included herein in its entirety. The presented actuating mechanism for a caster is preferably designed for casters having internal brake toothing or a ratchet (ratchet-wheel).

The presented actuating mechanism for a caster with internal brake toothing comprises a pin, in which the internal actuating mechanism of a caster is located, a bearing, a cover, which serves as a carrying member (e.g. fork) of a caster. The bearing for free rotation of the caster around the pin is located between the pin and the carrying member. In another embodiment, a caster with band brake can be fixed to the carrying member, as disclosed in the international patent application PCT/CZ2021/000017 filed by the same applicant which is thereby included herein in its entirety.

The caster pin comprises the entire internal actuating mechanism, as stated above, which comprises a cam mechanism that actuates position of the actuating pedal of the caster (movement of the caster, caster brake, and direction of caster, i.e. rotation around vertical axis of the caster), the pin comprises further number of interlocking lifting members, number of locking levers, preferably three locking levers, number of ratchets (ratchet-wheels) which engage springs, preferably four springs, wherein each locking lever has its own spring.

In the preferred embodiment, the cam mechanism, which actuates the individual positions of a caster, is designed and structured as disclosed below. The entire cam mechanism is located inside the caster pin. The cam mechanism comprises number of cams, preferably three types of cams as following: a cam A is the cam for position of the actuating pedal of the caster—the cam keeps the actuating pedal in three above defined positions: a cam B is the cam for direction of the caster—the cam engages or releases locking of direction;

and a cam C, which is the cam for braking the caster, and in parallel, of vertical brake of caster—the cam brakes the caster. The caster pin comprises also number of interlocking lifting members which are in contact with cams A, B and C. Each cam is in contact with one lifting member according to the type of the cam. The first cam A (the cam for position of the actuating pedal of the caster) is in contact with a lifting member of position of the actuating pedal, under which a spring is located. The cam A actuates the position of the actuating pedal of the caster by means of backstop of the actuating pedal, which bears on the cam A. The second cam B (the cam for direction of the caster) is in contact with a lifting member of direction of the caster, and a locking lever of direction of the caster, and a ratchet of direction of the caster, and a spring of direction of the caster, which is located between the carrying member and the locking lever of direction of the caster. The third cam C (the cam for braking the caster, and in parallel, of vertical brake of caster) is in contact with a lifting member of the brake, which actuates the locking lever of brake of the caster as well as the locking lever of vertical brake of caster. Both these locking levers of the caster engage the ratchet of brake of the caster and the ratchet of vertical brake of the caster and are restricted/defined by a spring of brake of the caster and a spring of vertical brake of the caster. The spring of brake of the caster and the spring of vertical brake of the caster also actuate the locking lever of brake of the caster and the locking lever of vertical brake of the caster.

When producing a caster according to the presented solution, each caster is always equipped with the same cam, which is triple in this preferred embodiment. However, a person skilled in the art could assemble a cam mechanism with two cams or a number of cams structured differently that will be able to actuate the caster by means of lifting members, locking levers, and ratchets.

In another embodiment, this presented cam mechanism may be used also with a caster having a band brake, as disclosed in the international patent application PCT/CZ2021/000017 filed by the same applicant which is thereby included herein in its entirety. Using this type of a caster enables to decrease the height of a patient support apparatus into the lowest possible safe position when keeping standard size of the caster, and to actuate other movements of the caster that are not possible with band brake such as e.g. movement around vertical rotation axis.

In this another embodiment, the caster with two-way band brake comprises a braking mechanism of caster located partially inside the inner space of the pin of the caster and partially inside the inner space of the caster, which is fixed on the lateral edge of a carrying member into which the two-way band brake system of the caster is attached to. The pin of the caster comprises also a vertical axis pivot, which rotates the caster around a vertical axis of the caster. The carrying member is fixed to the vertical axis pivot. The fork comprises a guiding bar of a yoke and also a support of a spring located under the guiding bar of a yoke. A lever of a spring support fits the yoke at least in one point, and this lever of the spring support is fixed to the carrying member in one point and is in contact with the control member of the caster. Optionally, in another embodiment, a lever actuated by the cam mechanism inside the pin above the carrying member fits the yoke, wherein a bearing for movement of the caster around the pin is located between the pin and the carrying member so that the caster having the band brake could have function of a standard caster as well as a guiding caster. In the preferred embodiment, the yoke is one unit with anchoring points, in another embodiment the yoke comprises at least two arms to fix the yoke and at least two arms to fix the brake band. Each arm of the yoke comprises at least one anchoring point, preferably there are two anchoring points at each arm shaped as T or a protrusion protruding out of the arm of the yoke to each side to create pairs.

Change of yoke position has essential impact on braking by two-way band brake. When releasing the lever on the yoke, the brake band shrinks around the brake drum by means of the spring. The spring does not develop sufficient force to brake the brake drum of the caster during the first phase. When releasing the lever to the yoke, the yoke leans and bears into the guiding bar of the yoke according to direction of rotation of the caster and thus force starts to develop according to lever ratio which consequently shrinks the brake band around the brake drum and the caster is braked. Change of yoke position is enabled due to symmetry of the yoke. By changing the direction of yoke into the other side the caster can be braked also during opposite direction of ride. In case of pressing the lever onto the yoke the anchoring points get closer to the caster centre and the brake band around the brake drum releases, which enables to unbrake (release) the caster which then can move free in both directions of rotation.

With respect to the cam mechanism there is no need to change the cam mechanism in the pin thanks to this presented solution. Should functions of a caster need to be changed, it is sufficient to change number of locking levers and ratchets (or ratchet-wheels). Change of number of locking levers and ratchets under the caster pin, wherein the cam mechanism inside the pin remains the same, causes decreasing of production costs and accelerating production time. At present, standard casters are equipped with different pins with different cams, which makes production expensive as number of different pins is produced, each with different cam mechanism for different functions of the caster.

As stated above, another advantage of this presented solution is quieter ride of the caster due to decreased forces exerted on actuating the caster or central caster control system, and it also enables to actuate the caster electronically using minimally powered electric motors such as servo motor (servo drive) and other electric motors with minimum voltage for optimized motor output.

EXEMPLARY EMBODIMENTS OF THE INVENTION

Figure 1:
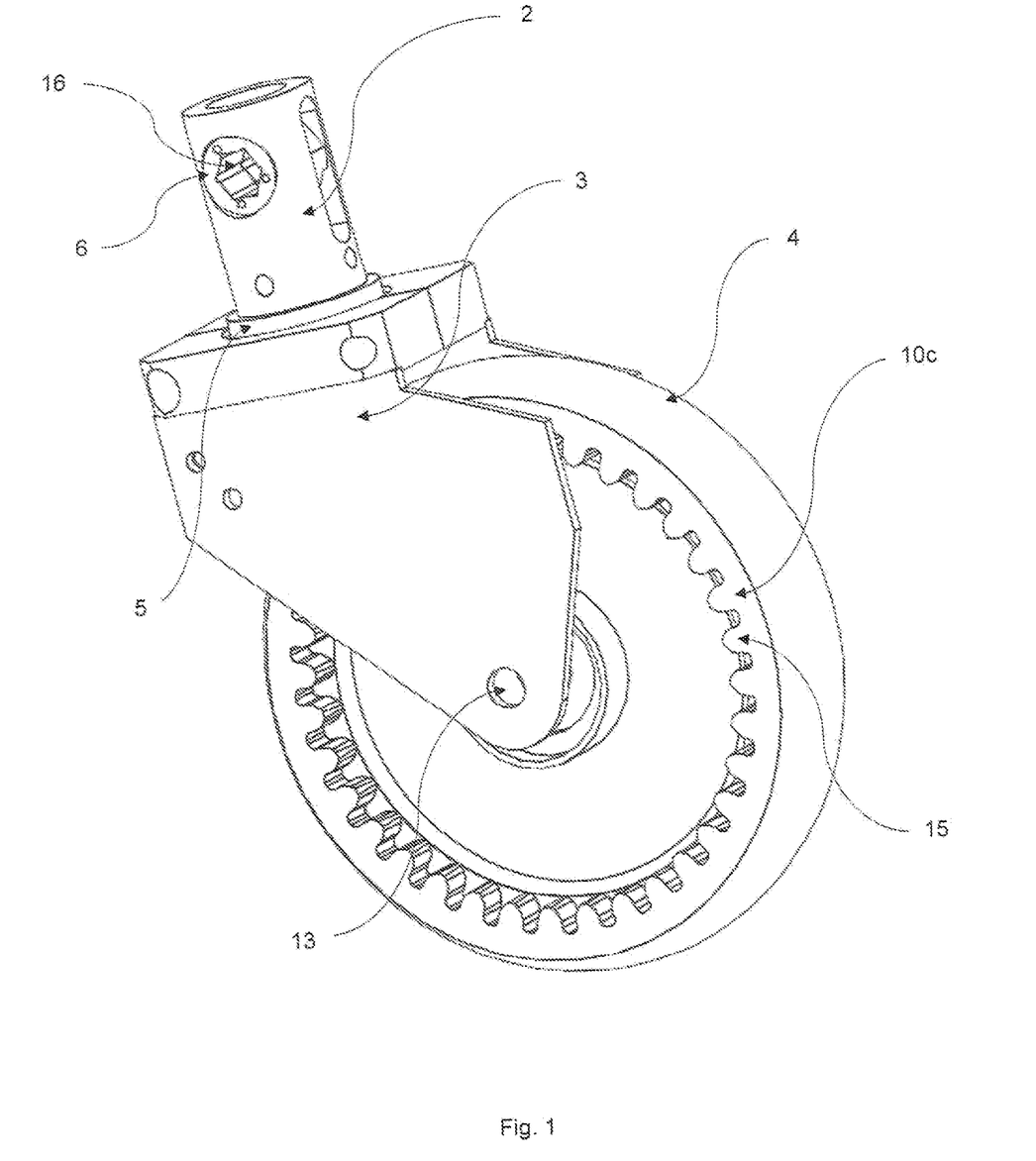
FIG. 1 shows side elevation of a caster with internal toothing and a pin attached to the carrying member (e.g. fork).

The FIG. 1 shows a caster 4 with internal toothing 1, preferably such caster can be used with wheeled equipment as e.g. trolleys, stretchers, patient support apparatuses, beds, tables, bedside tables, bars and similar types of furniture that need to be transported from one place A to another place B.

The FIG. 1 shows side elevation of a caster 4 with internal toothing 15, which is fixed to a carrying member 3 (e.g. fork) in the middle of the caster through opening 13 by means of fixing pin 14 (not shown). The fixing pin 14 for fixing the caster 4 in the carrying member 3 may be in form of a screw, rivet or any other types of pins. The carrying member 3 with vertical axis of rotation continues with bearing 5, which is attached to a pin 2. The side elevation of the pin 2 shows hexagonal opening 16 for fixing the actuating pedal 1 (not shown). This opening 16 is also opening for a cam mechanism 6. In another embodiment, a caster with two-way band brake 17 can be fixed to the carrying member 3 through opening 13 for fixing of the caster by means of fixing pin 14, see the FIG. 7 for details.

The presented solution discloses cam mechanism 6 comprising the same hexagonal opening 16 as other standard known types of simple cams. The presented cam mechanism 6 comprises a cam for position of the actuating pedal 6a, a cam for direction of the caster 6b and a cam for braking the caster and of vertical brake of caster 6c. Due to using of this cam mechanism 6 the overall braking system of the caster 4 reaches better qualities upon smaller demands on developing forces and smaller friction forces.

Figure 2:
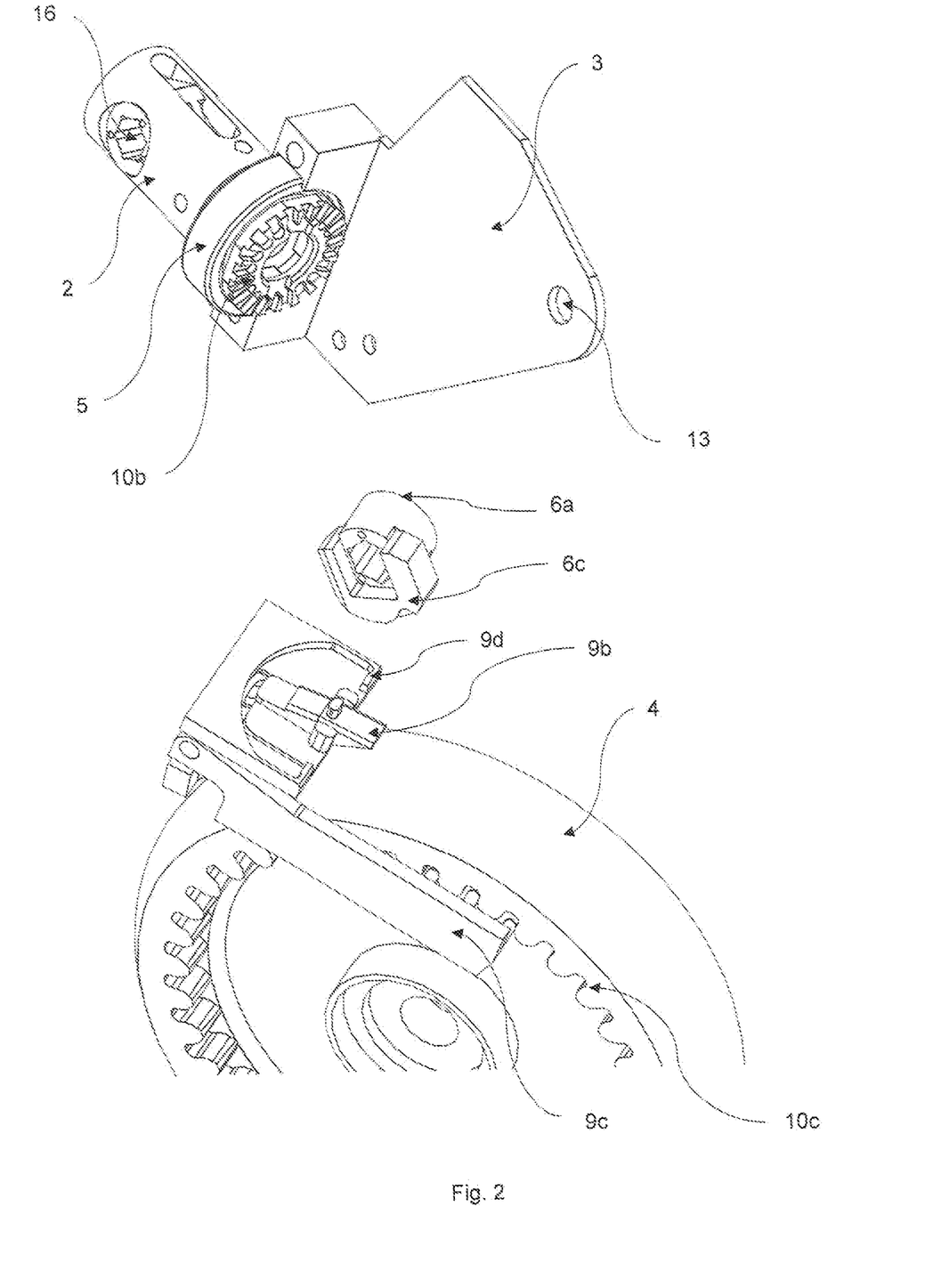
FIG. 2 shows axonometric projection of a caster with internal toothing, a carrying member (e.g. fork) and a part of a cam mechanism in detail drawing.

The FIG. 2 shows axonometric projection of a caster 4 in detailed drawing showing the caster 4 with internal toothing 15 comprising three locking levers 9: locking lever of direction of the caster 9b, locking lever of brake of the caster 9c and locking lever of vertical brake of the caster 9d, which are located under the cover of a carrying member 3 and a bearing 5 that continues a pin 2, in which the entire cam mechanism 6 is located (shown partially). The cam mechanism 6 comprises a cam for position of the actuating pedal 6a, a cam for direction of the caster 6b and a cam for braking the caster and of vertical brake of the caster 6c. The FIG. 2 also shows the carrying member 3 comprising an opening 13 for fixing of the caster, a ratchet of direction of the caster 10b, above which a mechanism of interlocking lifting members 8a, 8b and 8c (not shown) is located inside the pin 2. The bearing 5 is located above the ratchet of direction of the caster 10b and the pin 2 for fixing the caster to the frame of the patient support apparatus and attaching an actuating pedal 1 (not shown) is located above the bearing 5. The cam mechanism 6 is located in the upper part of the pin 2, however, to clarify the structure the cam mechanism 6 is disclosed separately in FIG. 3.

Figure 3:
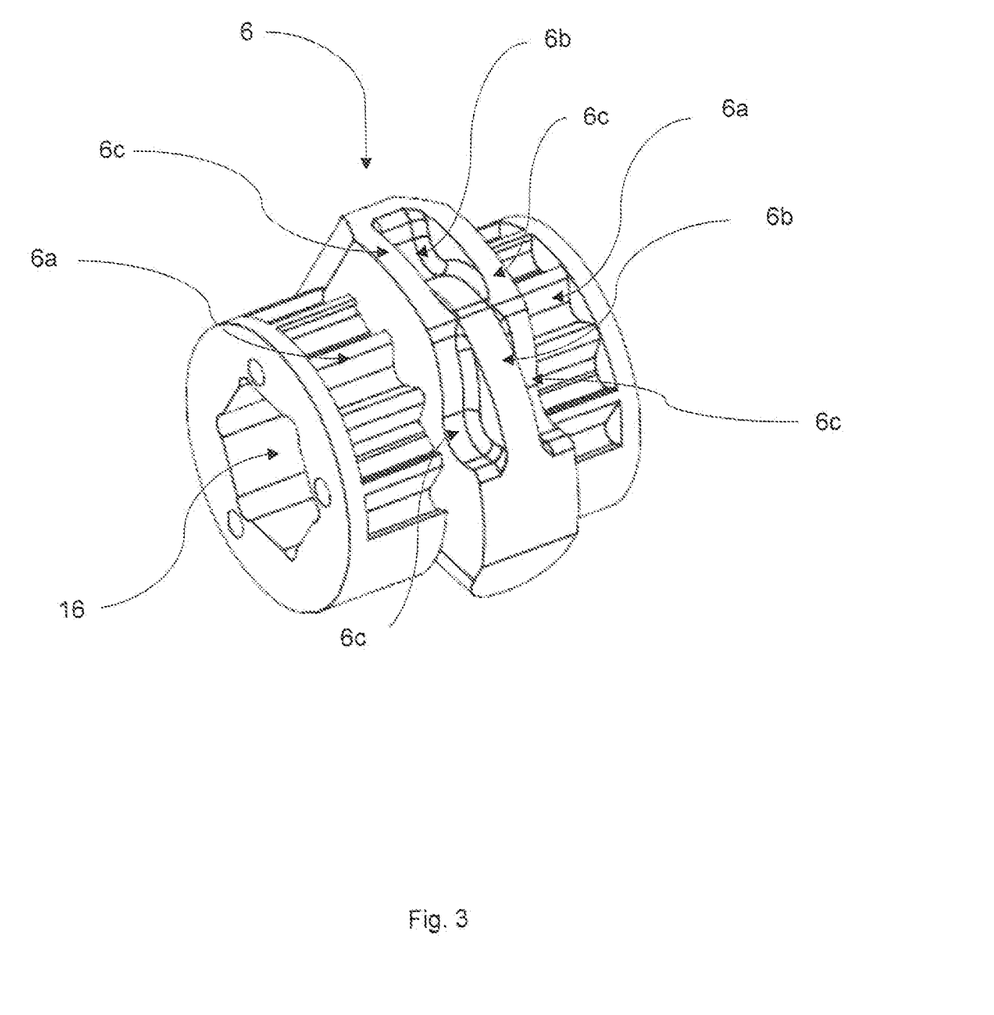
FIG. 3 shows axonometric projection of a cam mechanism.

The FIG. 3 shows axonometric projection of a cam mechanism 6 located in the upper part of a pin 2 of a caster 4 and being a part of the inner actuating mechanism that actuates all positions of the caster 4; rotation of the caster 4 around vertical and horizontal rotation axis, braking and direction of travel. The FIG. 3 shows that the cam mechanism 6 has a shape of a cylinder, which is hollow inside, comprising an opening which is an opening for the actuating pedal 16, in parallel, and has a hexagon shape. For better view the cam mechanism 6 is turned with bottom side upwards so that the individual parts of the cam mechanism 6 could be visible.

The cam mechanism 6 is divided into two parts for better assembly of the cam mechanism 6 into the pin 2. The first part is a cylinder with at least one side in a form of toothing which creates actuating part of the cam for position of the actuating pedal 6a. The second part fits in the middle part of the cylinder of the cam for position of the actuating pedal 6a, which is rectangular cut out so that the second part could set on the cylinder part of the cam for position of the actuating pedal 6a to create one component—i.e. the cam mechanism 6. The second part has a shape of two external waves and one internal wave. The FIG. 3 shows the waves in axonometric projection to be visible from above. Two external waves form the cam for braking the caster and of the vertical brake of the caster 6c, the internal wave forms the cam for direction of the caster 6b. In another embodiment, the second part of the cam mechanism 6 comprises different shapes of toothing. Optionally, the cam mechanism 6 may be produced from one piece of plastic material or metal or metal alloys.

Figure 4:
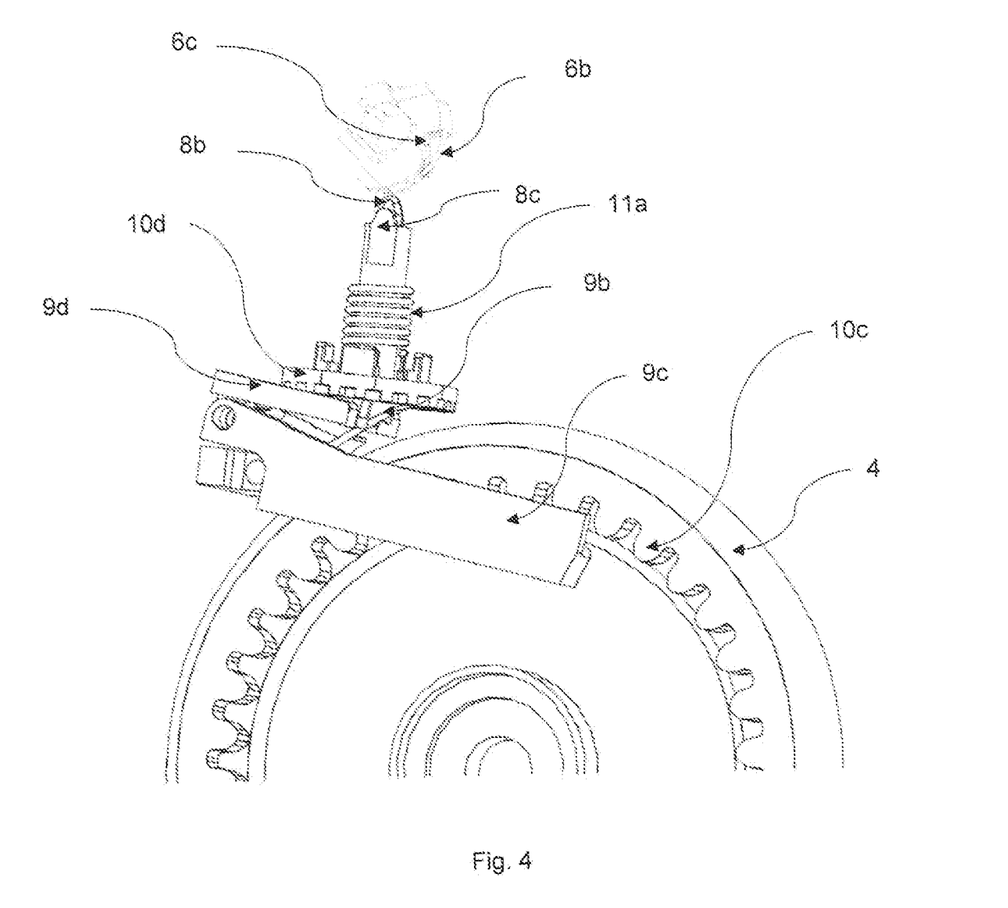
FIG. 4 shows side elevation of part of a cam mechanism and an internal actuating of a brake system of a caster with internal toothing that is located in the pin.

The FIG. 4 shows assembly of caster 4 comprising a pin 2 (not shown), a bearing 5 (not shown) and a carrying member 3 (not shown). The FIG. 4 shows a partial internal structure of the pin 2 which comprises a cam mechanism 6, wherein the FIG. 4 shows a cam for direction of caster 6b comprising an internal wave of the cam mechanism 6, a cam for braking the caster and of vertical brake of the caster 6c comprising external waves of the cam mechanism 6. The cam mechanism 6 is in contact with lifting members 8, wherein the FIG. 4 shows a lifting member of direction of the caster 8b and a lifting member of brake of the caster and of vertical brake of the caster 8c. In addition, the pin 2 further comprises a spring of position of the actuating pedal 11a, which is in contact with a lifting member of position of the actuating pedal 8a, which is shown in the FIG. 5. In parallel, the spring of position of the actuating pedal 11a is in contact with the pin 2 at one end and at another end with the lifting member of position of the actuating pedal 8a (not shown). A ratchet of vertical brake of the caster 10d comprises a ring gear having toothing at the bottom edge which engages teeth of a locking lever of vertical brake of the caster 9d and of a locking lever of direction of the caster 9b. The locking lever of vertical brake of the caster 9d and the locking lever of direction of the caster 9b are interlocked at least at one point, wherein they are in parallel in contact with the third locking lever of brake of the caster 9c at this point. A ratchet of brake of the caster 10c engages the locking lever of brake of the caster 9c, wherein this ratchet of brake of the caster 10c is an internal toothing 15 of the caster.

Figure 5:
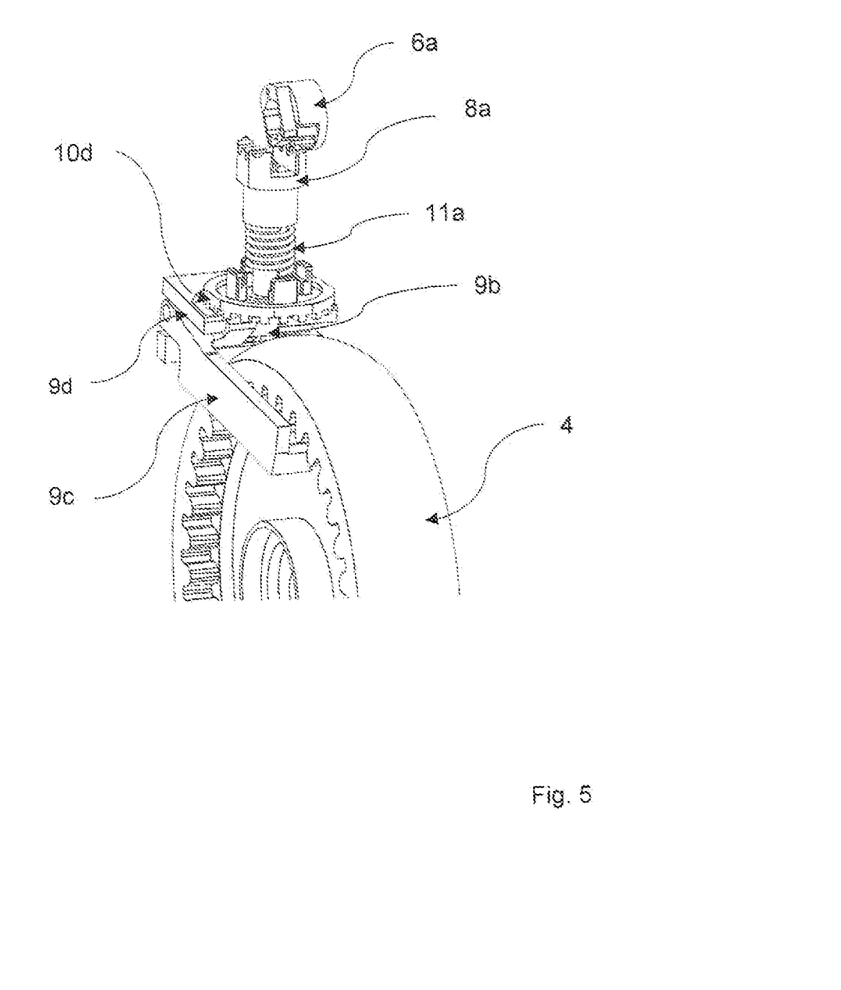
FIG. 5 shows axonometric projection of internal arrangement of a cam mechanism with a brake system of a caster with internal toothing.

The FIG. 5 shows axonometric projection of a part of the internal arrangement of a cam mechanism 6 with actuating mechanism of the caster 4. The FIG. 5 shows only that part of the cam mechanism 6, which actuates the position of the actuating pedal, i.e. a cam for position of the actuating pedal 6a, which bears on a toothed lifting member of position of the actuating pedal 6a, having shape of a rook (a toothed tower). The lifting member of position of the actuating pedal 8a comprises other two interlocked lifting members, i.e. lifting member of direction of the caster 8b and a lifting member of brake of the caster and of vertical brake of the caster 8c (not shown). The cam for position of the actuating pedal 6a and the lifting member of position of the actuating pedal 8a are in contact and continue a backstop of the actual pedal 12 (not shown here). A spring of position of the actuating pedal 11a is in contact with the lifting member of position of the actuating pedal 8a. All lifting members 8 are interlocked and are in contact with the cam mechanism 6, i.e. the cam for position 6a, the cam for direction 6b and the cam for braking and of vertical brake 6c of the caster. All lifting members 8, i.e. lifting members 8a, 8b and 8c are located in the pin 2 coaxially. A ratchet of vertical brake of the caster 10d comprises a ring gear having toothing at the bottom edge which engages teeth of a locking lever of vertical brake of the caster 9d and of a locking lever of direction of the caster 9b. A ratchet of brake of the caster 10c engages the locking lever of brake of the caster 9c, wherein this ratchet of brake of the caster 10c is an internal toothing 15 of the caster.

Figure 6:
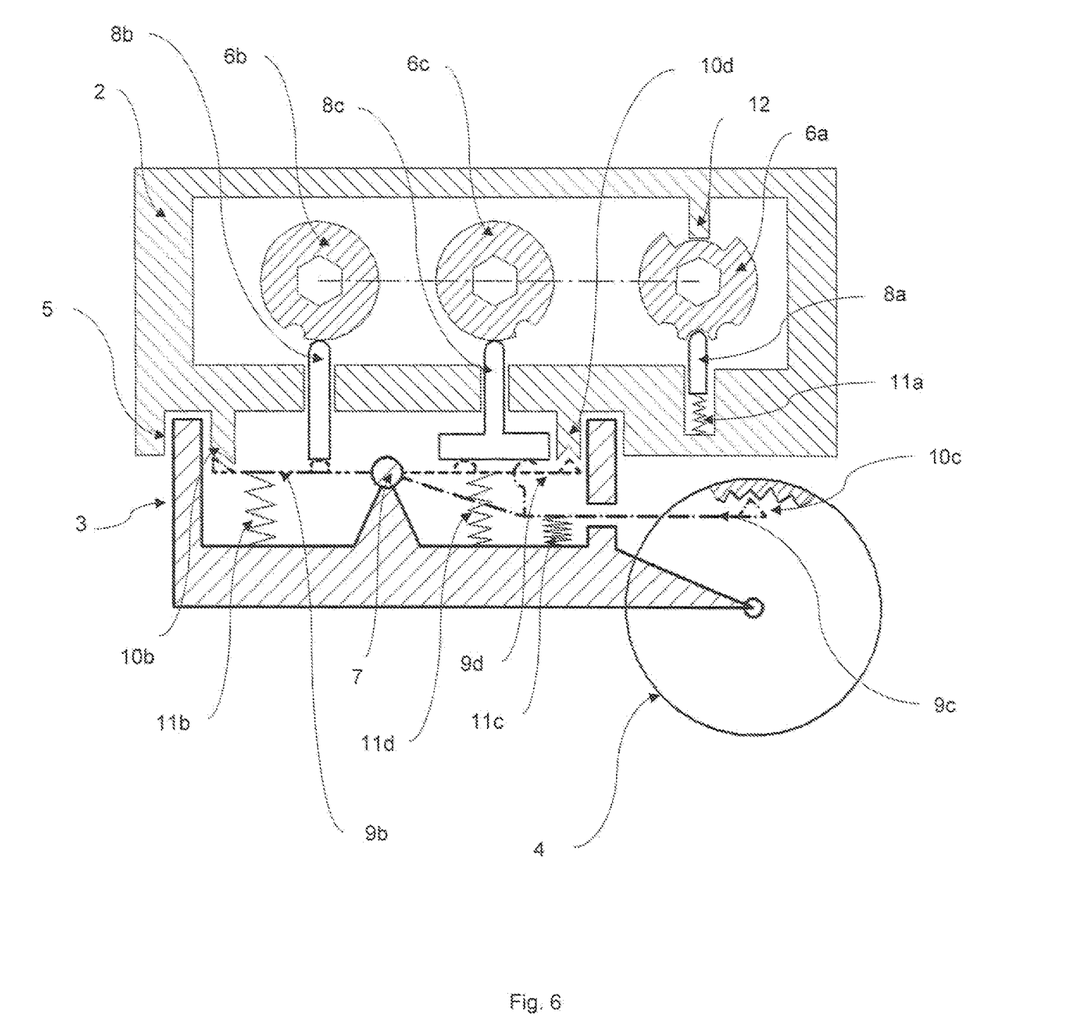
FIG. 6 shows kinetic scheme of an internal arrangement of a caster with internal toothing.

The FIG. 6 shows kinematic scheme of the entire cam mechanism 6. The FIG. 6 shows three independent cams of the cam mechanism 6 which actuates the individual positions of a caster 4. The FIG. 6 shows cross section of a pin 2 in which a cam for position of the actuating pedal 6a, a cam for direction of the caster 6b and a cam for braking and of vertical brake of the caster 6c are located. The pin 2 comprises also mutually interlocked lifting members 8 such that a lifting member of position of the actuating pedal a is in contact with the cam for position of the actuating pedal 6a a lifting member of direction of the caster 8b is in contact with the cam for direction of the caster 6b and a lifting member of brake and of vertical brake of the caster 8c is in contact with the cam for braking and of vertical brake of the caster 6c. The FIG. 6 obviously shows that the pin 2 continues with a carrying member 3 and a bearing 5 is located between the carrying member 3 and the pin 2. The caster 4 with internal toothing is attached to the carrying member 3, wherein the toothing of the caster is in parallel a ratchet of brake of the caster 10c. In another embodiment, a caster with two-way band brake 17 can be attached to the carrying member 3.

The first cam for position of the actuating pedal 6a is actuated by the lifting member of position of the actuating pedal 8a, under which a spring of position of the actuating pedal 11a is located. The spring of position of the actuating pedal 11a lifts the lifting member of position of the actuating pedal 8a, which bears on the cam for position of the actuating pedal 6a and locks the position of the actuating pedal 1 (not shown). The cam for position of the actuating pedal 6a also bears on a backstop of the actuating pedal 12 at edge positions. The backstop of the actuating pedal 12 is located above the cam mechanism 6 in the pin 2, by which position of the actuating pedal 1 is limited (not shown). The second cam for direction of the caster 6b actuates a locking lever of direction of the caster 9b by means of a lifting member of direction of the caster 8b. The locking lever of direction of the caster 9b is in contact with a pivot 7 and the distance between the locked and released position of the ratchet of direction of the caster 10p, i.e. locked and released mode of direction of the caster, is limited by a spring of direction of the caster 11b, which is located under the locking lever of direction of the caster 9b. The third cam for braking and of vertical brake of the caster 6c actuates the locking lever of brake of the caster 9c and the locking lever of vertical brake of the caster 9d by means of lifting member of brake and of vertical brake of the caster 8c. Both these levers 9c and 9d are in contact with the pivot 7 where the locking lever of vertical brake of the caster 9d is in level with the pivot 7, same as the locking lever of direction of the caster 9b wherein the locking lever of vertical brake of the caster 9d is limited by a spring of vertical brake of the caster 11d. The locking lever of brake of the caster 9c is in contact with the pivot 7, the lever 9c is limited by a spring of brake of the caster 11c.

Figure 7:
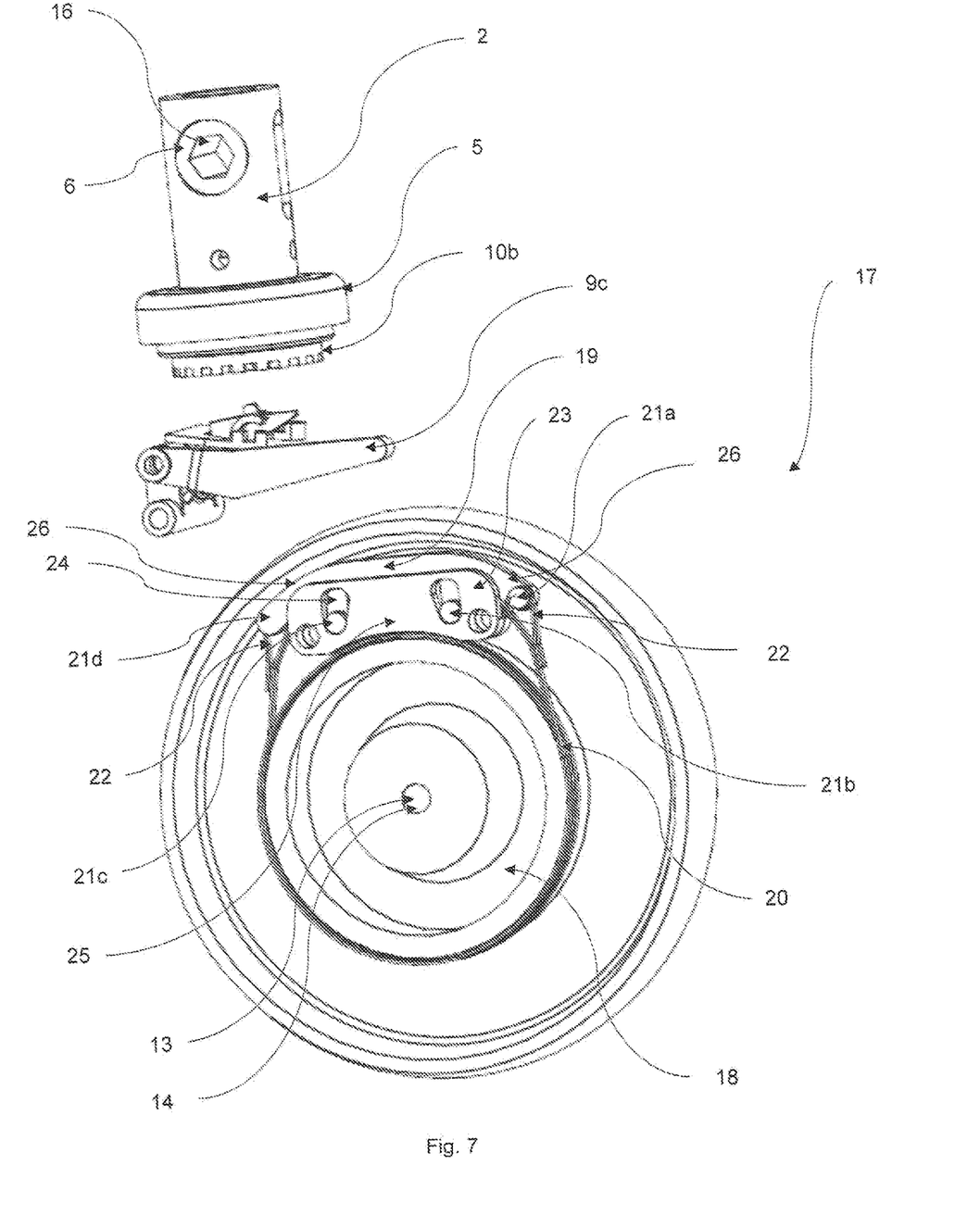
FIG. 7 shows side elevation of a brake system of a caster with a band brake, a pin and a lever.

The FIG. 7 shows braking mechanism shown as side elevation. The FIG. 7 shows a pin 2 which comprises a cam mechanism 6 which comprises a cam for position of the actuating pedal 6a, a cam for direction of the caster 6b and a cam for braking and of vertical brake of the caster 6c The internal arrangement of the pin 2 is the same as in all preceding figures. A bearing 5 is fixed to the pin 2 and under the bearing 5 there is located a carrying member 2 having a cover in which locking levers 9 are located, i.e. a locking lever of direction of the caster 9b, a locking lever of brake of the caster 9c and a locking lever of vertical brake of the caster 9d. A caster with two-way band brake 17 is fixed to the carrying member 3. The internal part of the caster with two-way band brake 17 comprises a inner brake drum 18, a yoke 19 with anchoring points 21 to fix a brake band 20, a band brake 20, which is fixed to the anchoring points 21 of the yoke 19 by lugs 22. The locking lever of brake of the caster 9c bears on the yoke 19 the lever is actuated by a cam for braking and of vertical brake of the caster 6c. When the locking lever of brake of the caster 9c bears on the yoke 19, the brake band 20 around the brake drum 18 is released by which the caster with two-way band brake 17 is released. In such case, the yoke 19 is in one plane with rotation axis and the caster with two-way band brake 17 is released.

Braking of the caster with two-way band brake 17 occurs at the moment, when the locking lever of brake of the caster 9c releases its pressure on the yoke 19, by which position of the yoke 19 changes. Release of lever force developed on the yoke 19 causes change of position by means of spring member 25 under yoke (not shown), due to which the brake band 20 shrinks around the brake drum 18 of the caster with two-way band brake 17. When the caster moves in the first phase, the spring member 25 under the yoke does not develop sufficient force to brake the brake drum 18 of the caster. At the moment locking lever of brake of the caster 9c is released onto the yoke 19, the yoke 19 leans and bears on the guiding bar 23 of the yoke according to direction of rotation of the caster with two-way band brake 17, and thus force is developed which consequently shrinks the brake band 20 around the brake drum 18 which brakes the caster with two-way band brake 17. Change of position of the yoke 19 is enabled by symmetry of the yoke 19 therewith that the yoke 19 changes position into the opposite direction of ride. By changing position of the yoke 19 into the opposite side, the brake drum 18 of the caster with two-way band brake 17 may be braked even during opposite direction of ride.

LIST OF REFERENCES

1) Brake pedal (of a caster) (not shown)
2) Pin
3) Fork (carrying member)
4) Caster (with internal toothing)
5) Bearing
6) Cam mechanism
6a) cam for position of actuating pedal
6b) cam for direction of caster
6c) cam for braking the caster and of vertical brake of caster
7) Pivot
8) Lifting member
8a) lifting member of position of actuating pedal
8b) lifting member of direction of caster
8c) lifting member of brake of caster and of vertical brake of caster
9) Locking lever
9b) locking lever of direction of caster
9c) locking lever of brake of caster
9d) locking lever of vertical brake of caster
10) Ratchet (ratchet-wheel)
10b) ratchet of direction of caster
10c) ratchet of brake of caster
10d) ratchet of vertical brake of caster
11) Spring
11a) spring of position of actuating pedal
11b) spring of direction of caster 11c) spring of brake of caster
11d) spring of vertical brake of caster
12) Backstop (of actuating pedal)
13) Opening (for fixing a caster)
14) Fixing pin (of a caster)—not shown
15) Internal toothing (of a caster)
16) Opening for actuating pedal
17) Caster with a two-way band brake
18) Brake drum
19) Yoke
20) Brake band (of a two-way band brake)
21) Anchoring point (a, b, c, d)
22) Lug (for fixing of a brake band)
23) Guiding bar of a yoke (with two openings)
24) Yoke support (not shown)
25) Spring member under yoke (not shown)
26) Yoke arms (not shown)

The invention claimed is:

1. An actuating mechanism assembly for a caster comprises a pin, a carrying member wherein an inner part of the pin comprises a cam mechanism comprising a cam for position of an actuating pedal of a brake pedal, a cam for direction of the caster operable to lock the caster in a direction position so that the caster is not free to change direction, and a cam for braking the caster and of vertical brake of the caster operable to fix the caster against rotation and lock the caster in a direction position so that the caster is not free to change direction, wherein each one of the cams is in contact with a corresponding one of three lifting members, wherein each one the lifting members is in contact with one of three locking levers, wherein each one of the locking levers is in contact with at least one ratchet, wherein at least some of the lifting members or locking levers are limited by at least one spring.

2. The actuating mechanism assembly for a caster according to claim 1, wherein the cam for position of the actuating pedal is in contact with one of the lifting members of position of the actuating pedal of the caster which is in contact with one of the springs of position of the actuating pedal.

3. The actuating mechanism assembly for a caster according to claim 2, wherein the spring of position of the actuating pedal bears onto a backstop of the actuating pedal by means of the lifting member of position of the actuating pedal and the cam for position of the actuating pedal.

4. The actuating mechanism assembly for a caster according to claim 1, wherein the cam for position of the caster is in contact with one of the lifting members of direction of the caster which is in contact with one of the locking levers of direction of the caster bearing onto one of the ratchets of direction of the caster, wherein the locking lever of direction of the caster is limited by one of the springs of direction of the caster.

5. The actuating mechanism assembly for a caster according to claim 1, wherein the cam for braking the caster and of vertical brake of the caster is in contact with one of the lifting members of brake of the caster and of vertical brake of the caster and actuates one of locking levers of brake of the caster and one of the locking levers of vertical brake of the caster.

6. The actuating mechanism assembly for a caster according to claim 5, wherein the locking lever of brake of the caster bears onto a ratchet of brake of the caster and is limited by a spring of brake of the caster.

7. The actuating mechanism assembly for a caster according to claim 5, wherein the locking lever of vertical brake of the caster bears onto a ratchet of vertical brake of the caster and is limited by a spring of vertical brake of the caster.

8. Actuating mechanism assembly for a caster according to claim 1, wherein the cam mechanism comprises a cylinder with inner cut, wherein at least one external part has a form of waves or protrusions which are in contact with at least one of three lifting members.

9. The actuating mechanism assembly for a caster according to claim 1, wherein the cam mechanism comprises two parts, wherein at least one part of this cam mechanism comprises the cam for position of the actuating pedal and at least one part of this cam mechanism comprises the cam for position of the caster and the cam for braking the caster and of vertical brake of the caster.

10. The actuating mechanism assembly for a caster according to claim 1, wherein the cam for braking the caster and of vertical brake of the caster is in contact with the lifting member of brake of the caster and of vertical brake of the caster and actuates the locking lever of brake of the caster bearing onto a yoke of a caster with two-way band brake.

11. The actuating mechanism assembly for a caster according to claim 1, wherein the cam mechanism comprises two parts, wherein the first part comprises a cylinder whose at least one part comprises toothing.

12. The actuating mechanism assembly for a caster according to claim 11, wherein the cam mechanism comprises two parts, wherein the second part fits into a middle part of the first part of the cylinder and the opposite side comprises two waves.

* * * * *